(12) United States Patent
Chen

(10) Patent No.: US 10,437,761 B2
(45) Date of Patent: Oct. 8, 2019

(54) UNIVERSAL SERIAL BUS MANAGEMENT

(71) Applicant: Hewlett-Packard Development Company, L.P., Houston, TX (US)

(72) Inventor: Wen Shih Chen, Taipei (TW)

(73) Assignee: Hewlett-Packard Development Company, L.P., Spring, TX (US)

(*) Notice: Subject to any disclaimer, the term of this patent is extended or adjusted under 35 U.S.C. 154(b) by 81 days.

(21) Appl. No.: 15/544,673

(22) PCT Filed: Apr. 17, 2015

(86) PCT No.: PCT/US2015/026446
§ 371 (c)(1),
(2) Date: Jul. 19, 2017

(87) PCT Pub. No.: WO2016/167802
PCT Pub. Date: Oct. 20, 2016

(65) Prior Publication Data
US 2017/0364463 A1  Dec. 21, 2017

(51) Int. Cl.
*G06F 13/38* (2006.01)
*G06F 13/42* (2006.01)
(Continued)

(52) U.S. Cl.
CPC .......... *G06F 13/385* (2013.01); *G06F 1/3215* (2013.01); *G06F 1/3253* (2013.01);
(Continued)

(58) Field of Classification Search
None
See application file for complete search history.

(56) References Cited

U.S. PATENT DOCUMENTS 6,128,743 A * 10/2000 Rothenbaum .......... G06F 1/266
                                                         710/100
6,473,078 B1 * 10/2002 Ikonen .................. G06F 1/3218
                                                         315/209 R
(Continued)

FOREIGN PATENT DOCUMENTS

CN       1823319      8/2006
CN     102156618      8/2011
(Continued)

OTHER PUBLICATIONS

"CCG1 Datasheet: USB Type-C Port Controller with Power Delivery"; Feb. 4, 2015; 36 pages.
(Continued)

*Primary Examiner* — Michael Sun
(74) *Attorney, Agent, or Firm* — HP Inc. Patent Department

(57) ABSTRACT

According to an example of managing a universal serial bus ("USB"), a device connected to a USB hub controller is sensed and a USB information scheme from the device is fetched. A power requirement of the device is determined through the USB information scheme, and a total power consumption of a plurality of devices connected to the USB hub controller is calculated. USB information scheme data to display to a user and a data display arrangement are determined, and a monitor scalar is instructed to display the USB information scheme in the determined data display arrangement. Power to the device is distributed based on the total power consumption of all devices connected to the hub controller and a user setting.

20 Claims, 3 Drawing Sheets

(51) Int. Cl.
*G06F 1/3234* (2019.01)
*G06F 1/3215* (2019.01)

(52) U.S. Cl.
CPC .. *G06F 13/4282* (2013.01); *G06F 2213/0042* (2013.01); *Y02D 10/14* (2018.01); *Y02D 10/151* (2018.01)

(56) References Cited

U.S. PATENT DOCUMENTS

| | | | |
|---|---|---|---|
| 6,646,685 B1 | 11/2003 | Kim | |
| 7,941,677 B2 | 5/2011 | Penning | |
| 8,084,987 B2 | 12/2011 | Hurtz | |
| 8,402,173 B2 | 3/2013 | Desai et al. | |
| 8,909,951 B2 | 12/2014 | Lin et al. | |
| 2006/0117195 A1 | 6/2006 | Niwa et al. | |
| 2007/0058332 A1* | 3/2007 | Canterbury | G06F 1/26 361/679.41 |
| 2008/0168283 A1 | 7/2008 | Penning | |
| 2009/0100275 A1* | 4/2009 | Chang | G06F 1/266 713/300 |
| 2010/0132004 A1 | 5/2010 | Ota et al. | |
| 2010/0180052 A1 | 7/2010 | Samura | |
| 2010/0268968 A1* | 10/2010 | Ghiasi | G06F 1/3203 713/300 |
| 2012/0005344 A1* | 1/2012 | Kolin | H05K 7/20836 709/226 |
| 2013/0013815 A1 | 1/2013 | Desai et al. | |
| 2013/0013936 A1 | 1/2013 | Lin et al. | |
| 2013/0191653 A1 | 7/2013 | Shih et al. | |
| 2014/0129738 A1 | 5/2014 | Hussain | |
| 2014/0164805 A1 | 6/2014 | Hasui | |
| 2014/0208134 A1 | 7/2014 | Waters et al. | |
| 2014/0297206 A1* | 10/2014 | Silverman | G01R 22/063 702/58 |
| 2015/0331826 A1* | 11/2015 | Ghosh | G06F 13/4022 710/313 |
| 2016/0179649 A1* | 6/2016 | Bank | G06F 21/55 713/340 |
| 2017/0222446 A1* | 8/2017 | Tan | H02J 7/007 |
| 2018/0091758 A1* | 3/2018 | Lee | G06F 3/14 |

FOREIGN PATENT DOCUMENTS

| | | |
|---|---|---|
| CN | 102749986 | 10/2012 |
| CN | 204179435 | 2/2015 |
| CN | 104505642 | 4/2015 |
| EP | 1659478 | 5/2006 |
| JP | 10-116139 | 5/1998 |
| JP | H10-116139 | 5/1998 |
| JP | 2003-029885 | 1/2003 |
| JP | 2012-063817 | 3/2012 |
| KR | 2007 0104743 | 10/2007 |
| TW | 201303567 A1 | 1/2013 |
| TW | 201331744 A1 | 8/2013 |
| WO | WO-2005/022369 | 3/2005 |
| WO | WO-2011/041734 | 4/2011 |
| WO | WO-2014/136176 | 9/2014 |

OTHER PUBLICATIONS

Lattice Semiconductor; "Implementing Flexible USB Type-C Control Using FPGA Technology"; Nov. 2014; 10 pages.

* cited by examiner

UNIVERSAL SERIAL BUS MANAGEMENT

BACKGROUND

Electronic devices in the consumer, commercial, and industrial sectors may include a data port such as a universal serial bus ("USB") port to send and receive data from a host device. Versions of USB specifications may also include the ability to transmit data, video, and power over a single cable.

DETAILED DESCRIPTION

Figure 1:
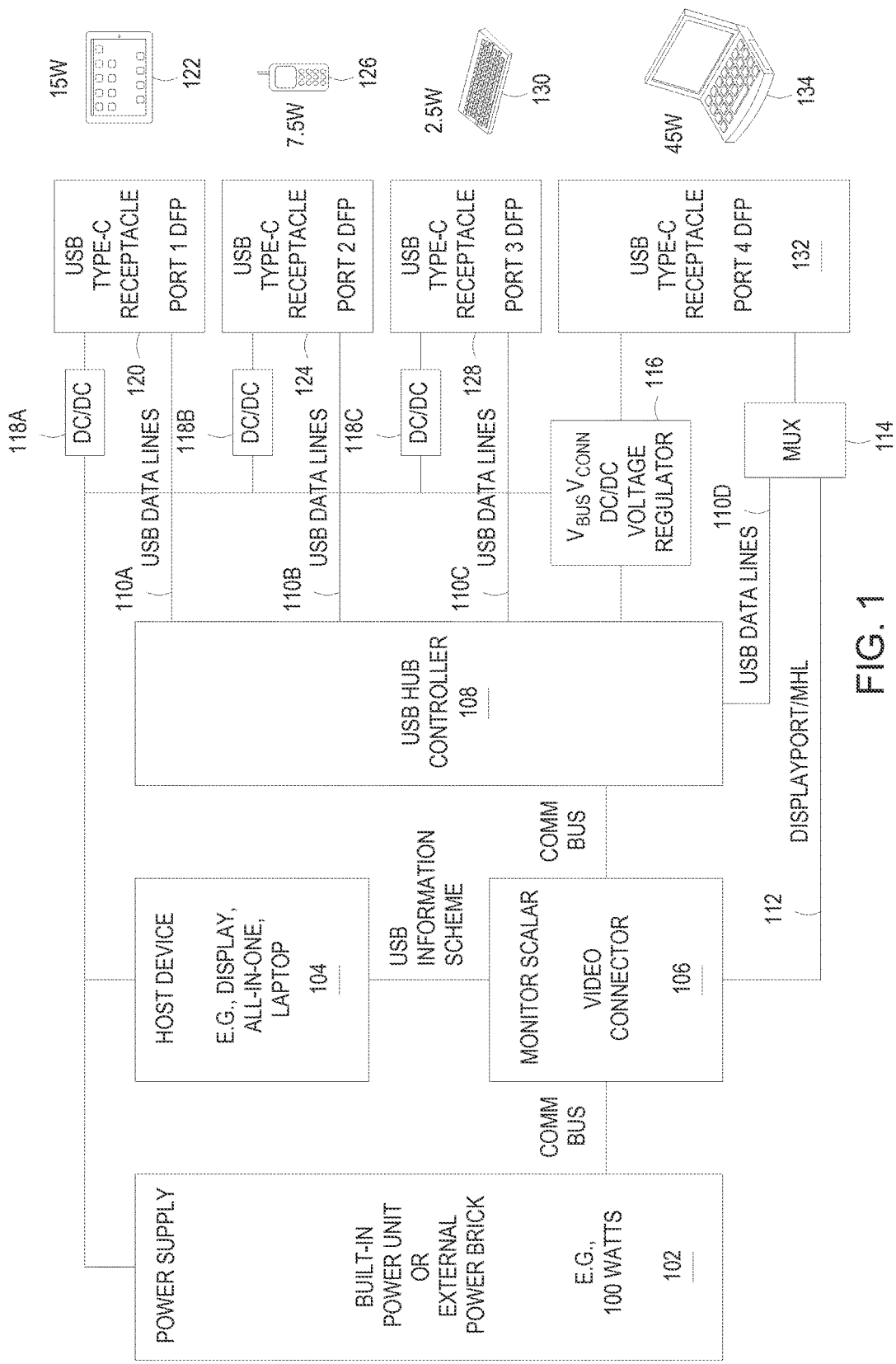
FIG. 1 illustrates a device including a USB hub controller, according to an example of the present disclosure.

Various examples described below provide for managing a universal serial bus, including determining a power requirement of a device connected to a hub controller, calculating a total power consumption of devices connected to the hub controller, and determining which USB information scheme or other data related to a USB device to display to a user. According to some examples, the USB information scheme may be displayed such as by using a monitor scalar, e.g., through an on-screen display, or may be multiplexed with other video streams or content. Power may be distributed based on the total power consumption of all devices connected to the hub controller and/or based on a user setting or preference.

In some examples, the USB information scheme may also include a data transmission rate or other data related to the universal serial bus or connected devices, and values such as data transmission rates may be negotiated, including negotiation based on a user setting or preference.

In general, users of electronic devices such as desktop computers, laptop computers, tablets, mobile devices, printers, retail point of sale devices, monitors, displays, and other devices (hereinafter "device" or "devices") may seek to connect such a device to external devices or peripherals. For example, a user of a monitor may seek to connect the monitor to a tablet, mobile device, keyboard, and/or laptop, with the monitor serving as a hub.

Various standards such as USB may define the cables, connectors, and communications protocols used to connect devices and supply power to devices. USB 2.0, for example, is a widely-used standard which allows a data transmission or signaling rate of 480 megabits per second, while USB 3.0 is capable of handling 5.0 gigabits per second while retaining backwards compatibility with USB 2.0.

USB Type-C defines a new, small reversible-plug connector for USB devices. USB Type-C cables may be active, electronically marked cables comprising a chip and ID function based on the configuration data channel and vendor-defined messages. USB Type-C supports data transmission at up to 10.0 gigabits per second, has the capacity to charge up to 100 watts and 20 volts, and may transmit video such as native DisplayPort video alongside other streams.

As more devices connect through USB Type-C, it becomes increasingly more difficult to manage and understand the various power and data transmission demands of each device connected to, for example, a single USB hub controller. In an example of a monitor (or "host device") including a USB hub controller connected to two mobile devices, a tablet, and a laptop, each of the connected devices may have their own power and data transmissions requirements, which may exceed the capacity of USB Type-C and/or the hub controller.

For example, each of the mobile devices and tablet may demand 15 watts, and the laptop may demand 45 watts, totaling 90 watts. In the event that the hub controller on the monitor is powered only by a 65 watt power source, the hub controller will not be able to power all of the connected devices. A user in such an example would presently have no way to visually understand and manage the power requirements of each connected device, and no way to visualize, prioritize, or set preferences with regard to power distribution. For example, a user may wish to prioritize charging of a mobile device with a drained battery over supplying power to a USB hard disk that is not actively being accessed.

In a similar example, each of the mobile devices and tablet may demand 2 gigabits per second of data transmission, while the laptop may demand 5 gigabits per second of data transmission, totaling 11 gigabits per second and exceeding an example data transmission limit of a version of USB Type-C. As above, a user in such an example would presently have no way to understand and manage the data transmission requirements of each connected device, and no way to visualize, prioritize, or set preferences with regard to data transmission limits, caps, and/or throttling. For example, a user may wish to prioritize data transmission to a tablet to copy a batch of photos before traveling, while throttling or even delaying data transmission to a backup drive that is not as time-sensitive.

These issues and user confusion in general are compounded by the fact that host devices such as a monitor may support legacy connections, such as USB 2.0, which have different data transmission and power delivery requirements than newer versions of the USB standard, and which may not support other features such as video. User confusion can be further compounded when power or data requirements are variable and changing based on, for example, device usage.

According to an example of managing a universal serial bus, a device connected to a USB hub controller is sensed and a USB information scheme from the device is fetched. A power requirement of the device is determined through the USB information scheme, and a total power consumption of a plurality of devices connected to the USB hub controller is calculated. USB information scheme data to display to a user and a data display arrangement are determined, and a monitor scalar is instructed to display the USB information scheme in the determined data display arrangement. Power to the device is distributed based on the total power consumption of all devices connected to the hub controller and a user setting. In some examples, the USB information scheme data may be multiplexed with a video stream.

FIG. 1 illustrates a device including a USB hub controller, according to an example of the present disclosure.

FIG. 1 includes a host device 104. Host device 104 may be a monitor, display, all-in-one computer, laptop, desktop, printer, retail point-of-sale device, or other device. Generally, host device 104 may be a device used as a hub for a variety or plurality of USB devices to send and receive data and/or video, and/or to receive power. For example, host device 104 may be a computer monitor with a multitude of USB ports.

Host device 104 may include a power supply 102, which may used to supply power both to host device 104 and USB devices, discussed in more detail below. Power supply 102 may be, for example, a built-in power unit, an external power brick or adapter, or another power source. In some examples, power supply 102 may supply 100 watts of power. Power supply 102 may also convert power, such as converting AC power to DC power.

Host device 104 may also include a monitor scalar 106, which may include a video connector such as a DisplayPort connector or port 112. Monitor scalar 106 may be used to display video on a screen, including video overlays. For example, monitor scalar 106 may be used to display an on-screen display or menu, separate from content rendered by an operating system.

Host device 104 may also include or communicate with a USB hub controller 108. USB hub controller 108 may be an integrated circuit or, more specifically, a Inter-Integrated Circuit ("I$^2$C") which may be a multi-master, multi-slave, single-ended, serial computer bus.

In some examples, power supply 102 may communicate with monitor scalar 106 via a communications bus, and monitor scalar 106 may communicate with USB hub controller 108 via the same or separate communications bus.

USB hub controller 108 may also communicate with USB receptacles or "ports" such as USB receptacles 120, 124, 128, and 132. USB receptacles 120, 124, 128, and 132 may all be USB Type-C in one example, or other USB port types, or a combination of USB port types.

USB hub controller 108 may communicate with USB receptacles via, for example, USB data lines 110A-D. USB hub controller 108 may pull data from USB devices, or USB devices may push data to USB hub controller 108. Aside from a normal data payload, USB data lines 110A-D may transmit, via the push or pull methods, a USB information scheme from USB devices. A USB information scheme may include data or metadata related to the device, such as power requirements, data transmission requirements, device name, device type, or other information useful in identifying or using the device.

USB hub controller 108 may also supply power to USB receptacles 120, 124, 128, and 132 via, for example, DC power 118A-C, or DC/DC voltage regulator 116.

In one example, data from USB hub controller 108 via USB data line 110D and video from DisplayPort or Mobile High-Definition Link ("MHL") may be multiplexed, e.g., at MUX 114, for transmission to USB Type-C receptacle 132. Multiplexing may include combining various video streams into a single stream. For example, as discussed below in more detail, a video stream may be multiplexed with the USB information scheme discussed above, or a subset of data from the USB information scheme.

USB receptacles 120, 124, 128, and 132 may be connected to a plurality of devices, such as tablet 122, mobile device 126, keyboard 130, and/or laptop 134, as examples. As discussed above, each of devices 122, 126, 130, and 134 may have their own power requirements and data transmission requirements, which may be variable.

Figure 2:
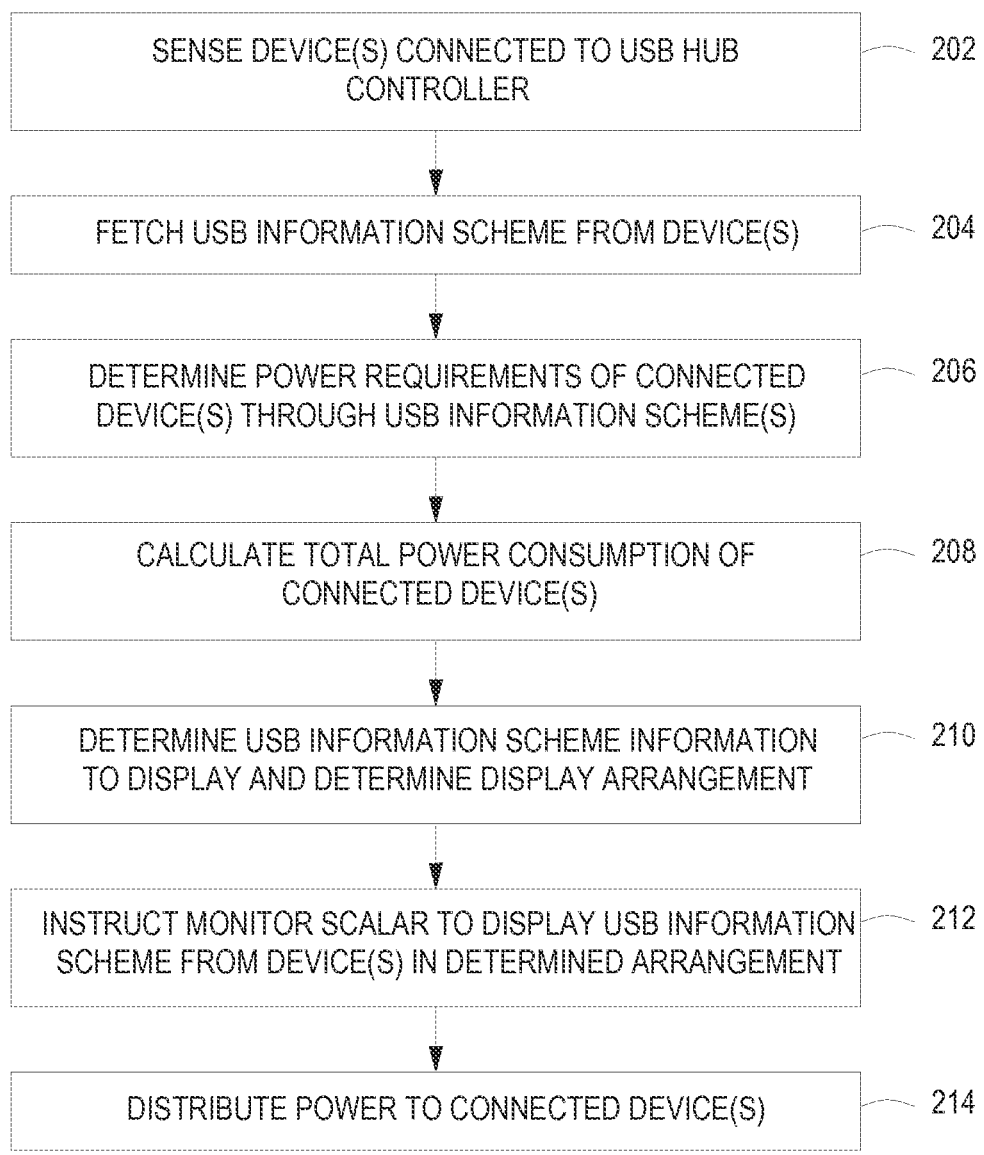
FIG. 2 illustrates a flowchart for managing a universal serial bus, according to an example of the present disclosure.

FIG. 2 illustrates a flowchart for managing a universal serial bus, according to an example of the present disclosure.

In block 202, a device connected to a universal serial bus hub controller is sensed. A device may be, for example, tablet 122 of FIG. 1. The tablet may be sensed by receptacle 120, or USB hub controller 108.

In block 204, a universal serial bus information scheme from the device is fetched. As discussed above, a USB information scheme may include data or metadata related to the device, such as power requirements, data transmission requirements, device name, device type, or other information useful in identifying or using the device. For example, a USB information scheme for device 122 may include a power requirement of 1.5 watts, a data transmission rate of 1 gigabit per second, and a device name of "User's Tablet".

In block 206, a power requirement of the device through the universal serial bus information scheme is determined. For example, the USB information scheme discussed above may be parsed to determine that the power requirement of a tablet is 15 watts. In some cases, the power requirement may be variable.

In block 208, a total power consumption of a plurality of devices connected to the universal serial bus hub controller is calculated. In the example of FIG. 1, a total power consumption of 70 watts may be calculated. Block 208 may also include sensing that the power supply to a host device, e.g., to host device 104, is of a certain wattage, e.g., 100 watts for power supply 102.

In block 210, universal serial bus information scheme data to display to a user is determined, along with a data display arrangement. For example, a determination may be made that the user should be presented with only a device name and a power consumption level, but not a data transmission rate (i.e., for devices where data transmission is not relevant or important), with the device name displayed on a screen relative to the physical location of the port on the host device, such as a monitor. In another example, the device names may be displayed in a vertical list with the data transmission requirements of each device. In yet another example, a logo, icon, or graphic may be displayed for each device representing a USB type, such as USB Type-C, along with both a power requirement and data transmission rate, or other data from the USB information scheme. Determinations of which data to display and locations may be based on device types, user preferences, manufacturer settings, or other factors relevant to the devices.

In some examples, the data displayed in block 210 may also include an option for a user to set a preference or other user setting. For example, the user may be able to prioritize one device over another in terms of power distribution or data transmission, or set caps, limits, thresholds, warnings, or other metrics or orders. In another example, the display may include sums or totals of power consumption, data transmission, or other data parsed or derived from the USB information scheme.

In block 212, a monitor scalar is instructed to display the universal serial bus information scheme in the determined data display arrangement. En one example, the data may be displayed as an on-screen menu, either when a device is plugged in, when a host device is turned on, or in response to a user key press or other input. As discussed above, the data that is displayed in block 212 may be multiplexed with other data or video streams, such as content from an operating system.

In block 214, power to the device is distributed based on the total power consumption of all devices connected to the hub controller and, for example, a user setting. For example, a user may wish to prioritize charging of a mobile device with a drained battery over supplying power to a USB hard disk that is not actively being accessed.

In other examples, block 214 may comprise distributing, allocating, or negotiating data transmission rates, or other values associated with the USB devices connected to a USB hub controller.

Figure 3:
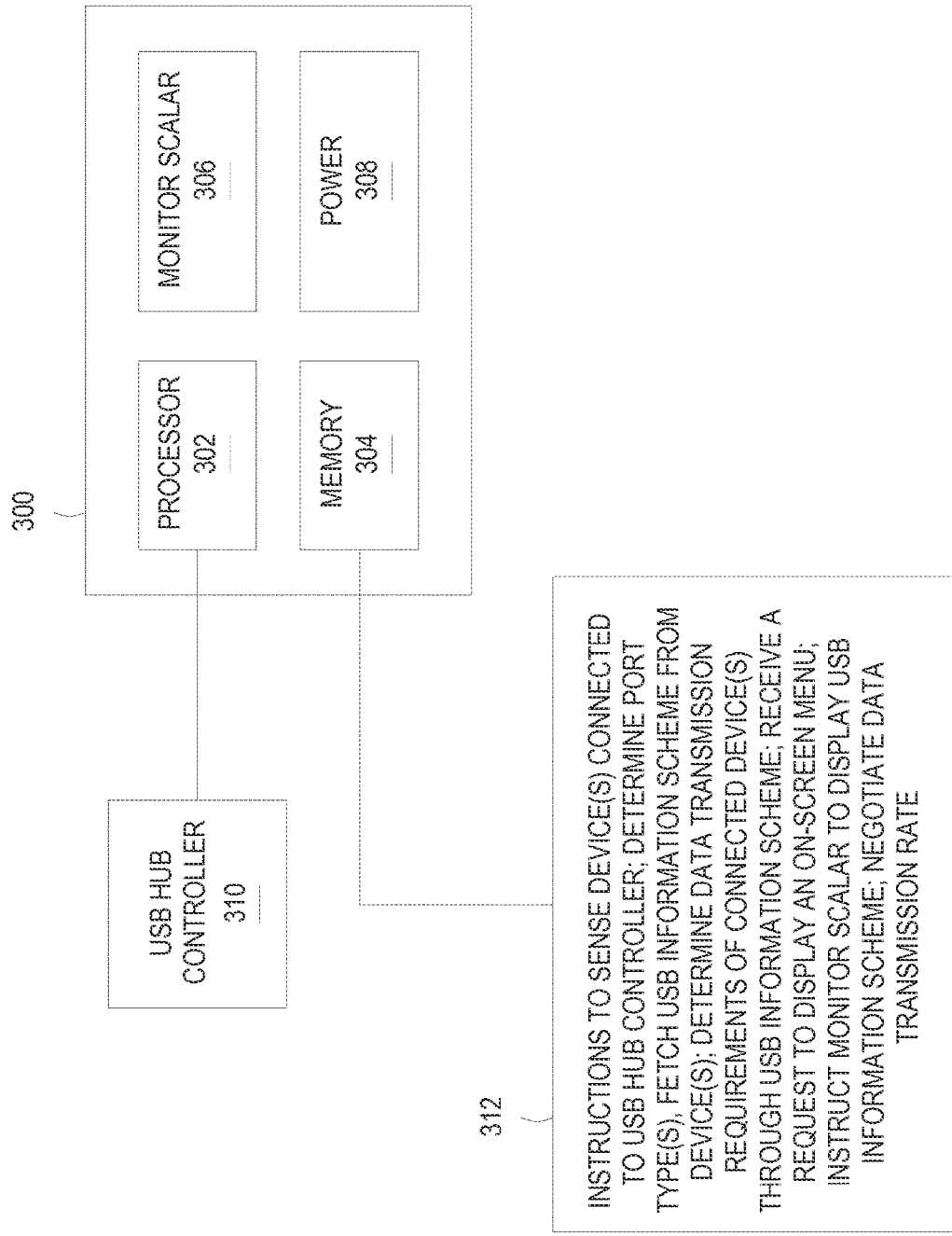
FIG. 3 illustrates a schematic representation of a computing device that may be used as a platform for managing a universal serial bus, according to an example of the present disclosure.

FIG. 3 illustrates a schematic representation of a computing device that may be used as a platform for managing a universal serial bus, according to an example of the present disclosure.

In an example, device 300 may be a device which serves as a hub for USB devices. Device 300 may comprise a power source 308, which may be an external, internal, or integrated battery, or other battery capable of supplying power to device 300, or a hard-wired power source such as AC power. In some examples, power source 308 may be a LiION battery.

Device 300 may comprise processing resource 302 such as a processor, CPU, embedded controller, or other processor, and a memory 304, such as a RAM, Flash memory, or other memory storage. Device 300 may also comprise a PMIC or other device capable of communicating with power source 308. Device 300 may also have an output, such as a connection to a display, status lights, speaker, or other output.

Device 300 may also include a monitor scalar 306, which may convert and/or output video streams to, for example, a display or screen. In some examples, monitor scalar 306 may allow an on-screen display or menu to be laid over other video content, such as a video stream or video data from an operating system video driver or other device driver. Monitor scalar may communicate with, among other components, a multiplexer.

Device 300 may also include a USB hub controller 310, which may be an integrated circuit or, more specifically, a Inter-Integrated Circuit ("I²C"), as discussed above. USB hub controller 310 may include a plurality of USB receptacles or ports, which may be USB Type-C, another version of the USB standard, or a combination thereof.

Processor 302 may carry out instructions stored on non-transitory computer-readable storage medium. Each of these components may be operatively coupled to a bus.

Some or all of the operations set forth in the figures may be contained as a utility, program, or subprogram in any desired computer readable storage medium, or embedded on hardware. The computer readable medium may be any suitable medium that participates in providing instructions to the processing resource 302 for execution. For example, the computer readable medium may be non-volatile media, such as an optical or a magnetic disk, or volatile media, such as memory. The computer readable medium may also store other machine-readable instructions, including instructions downloaded from a network or the internet. In addition, the operations may be embodied by machine-readable instructions. For example, they may exist as machine-readable instructions in source code, object code, executable code, or other formats.

Instructions 312 may include, for example, instructions to sense device(s) connected to a USB hub controller; determine port type(s); fetch a USB information scheme(s) from device(s); determine data transmission requirements of connected device(s) through USB information scheme(s); receive a request(s) to display an on-screen menu; instruct a monitor scalar to display the USB information scheme(s); and to negotiate a data transmission rate(s).

In certain examples, some or all of the processes performed herein may be integrated into an operating system. In certain examples, the processes may be at least partially implemented in digital electronic circuitry, in computer hardware, in machine readable instructions, or in any combination thereof.

What is claimed is:

1. A method for managing a universal serial bus, comprising:
   sensing a device connected to a universal serial bus hub controller;
   fetching, with a communication resource, a universal serial bus information scheme from the device;
   determining a power requirement of the device through the universal serial bus information scheme;
   calculating, with a processing resource, a total power consumption of a plurality of devices connected to the universal serial bus hub controller;
   determining universal serial bus information scheme data to display:
   determining a data display arrangement including a location to display the determined universal serial bus information scheme data to display;
   instructing a monitor scalar to cause a screen to display the universal serial bus information scheme in the determined data display arrangement and the total power consumption; and
   distributing power to the device based on the total power consumption of the plurality of devices connected to the hub controller and a user setting.

2. The method according to claim 1, further comprising multiplexing the universal serial bus information scheme in the determined data display arrangement with video content.

3. The method according to claim 1, wherein the user setting is a power distribution preference.

4. The method according to claim 3, wherein the user setting is based on a device battery level.

5. The method according to claim 1, wherein the universal serial bus information scheme is embedded onto an on-screen display.

6. The method according to claim 1, wherein the universal serial bus hub controller is connected to a universal serial bus type C receptacle.

7. The method according to claim 1, wherein the location is determined based on a port location corresponding to where the device is connected to the universal serial bus hub controller.

8. The method according to claim 1, wherein the location is determined based on a device type.

9. The method according to claim 1, wherein the location is determined based on a manufacturer setting.

10. The method according to claim 1, wherein:
    the display information is determined to be displayed based on the user setting and a universal serial bus device type; and
    the location at which to present the display information is determined based on the user setting and a port location of the universal serial bus hub controller corresponding to the universal serial bus device type.

11. The method according to claim 1, wherein determining universal serial bus information scheme data to display is based on:
    identification information of the device or
    functionally information of the device.

12. A system for universal serial bus management, comprising:
    a power supply;
    a universal serial bus receptacle;
    a universal serial bus hub controller, the universal serial bus hub controller to:
       receive a universal serial bus information scheme from a device through the universal serial bus receptacle and determine a display arrangement for the universal serial bus data with at least one other universal serial bus information scheme from another device; and a monitor scalar, the monitor scalar to cause a screen to display the universal serial bus data and a total power consumption level.

13. The system of claim 12, further comprising a multiplexer to multiplex the universal serial bus data and video data.

14. The system of claim 12, wherein the universal serial bus hub controller is a Inter-Integrated Circuit.

15. The system of claim 12, wherein the universal serial bus receptacle is a type-C receptacle.

16. The system of claim 12, wherein the monitor scalar is to:
    convert a video stream; and
    overlay the on-screen menu at the location on the video stream relative to a physical location of a port on which the device is connected.

17. A non-transitory computer-readable storage medium on which is stored a computer program for managing a universal serial bus, said computer program comprising a set of instructions to:
    sense a device connected to a universal serial bus hub controller;
    determine a port type of the device and a port location corresponding to a physical location of a port on which the device is connected to a host;
    fetch a universal serial bus data scheme from the device;
    determine a data transmission requirement of the device via the data scheme;
    receive a request to display an on-screen menu on a display;
    instruct a monitor scalar to cause display of the data scheme with the on-screen menu at a screen location relative to the physical location of the port on which the device is connected; and
    negotiate a data transmission rate based on the universal serial bus data scheme and a user setting.

18. The computer-readable storage medium of claim 17, further comprising instructions to multiplex the on-screen menu, the data scheme, and a video stream.

19. The computer-readable storage medium of claim 17, wherein the user setting is based on a data transmission priority preference.

20. The computer-readable storage medium of claim 17, wherein the user setting is based on a data transmission rate preference.

* * * * *